E. A. FORD.
INTERNAL COMBUSTION ENGINE.
APPLICATION FILED JAN. 13, 1911.
1,165,086.
Patented Dec. 21, 1915.
3 SHEETS—SHEET 3.
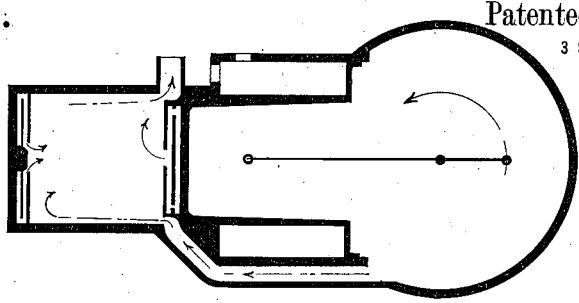
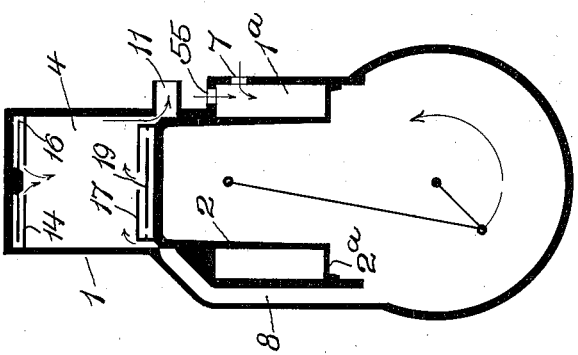
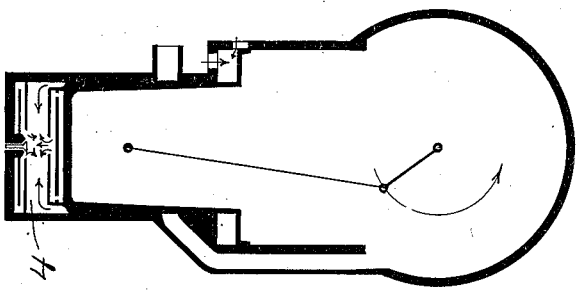
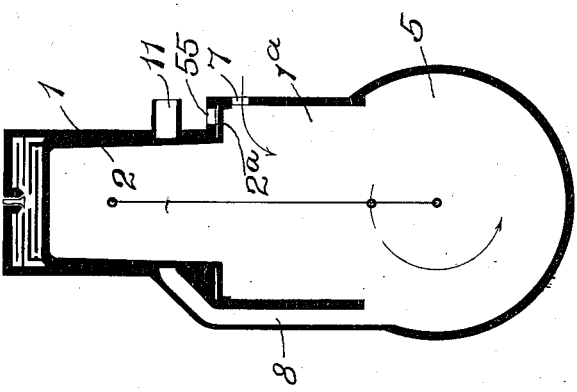
WITNESSES.
Harry L. Allen.
F. M. Ronlstone
INVENTOR
Eugene A. Ford
by Wright, Brown, Quinby & Hay
Attys.

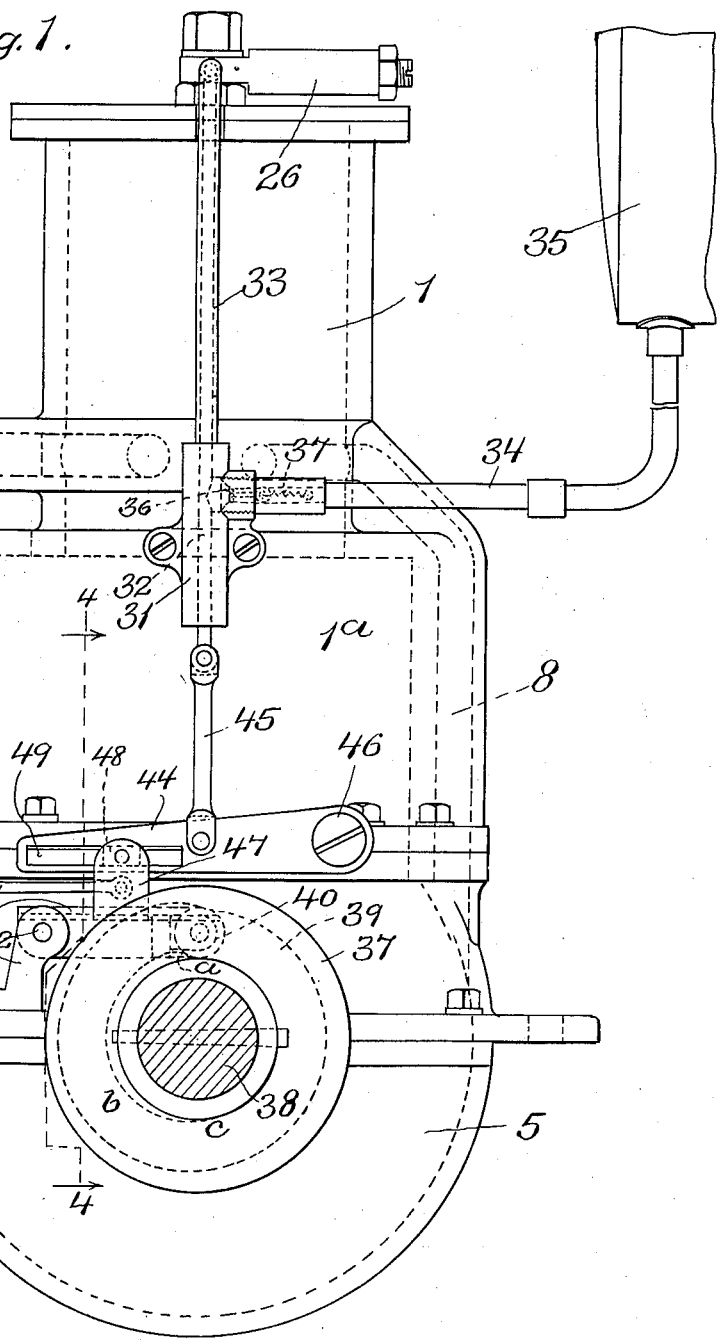

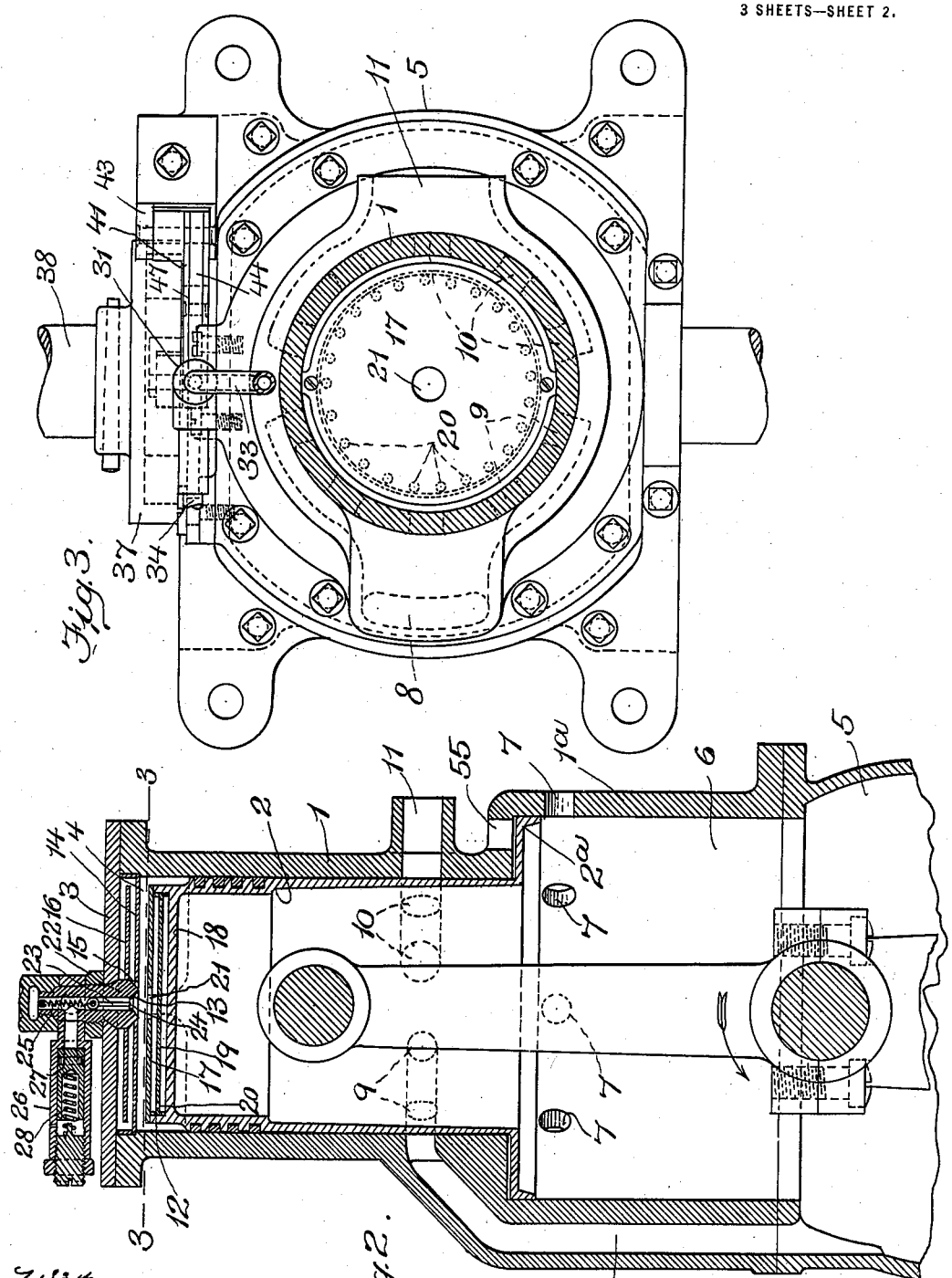

UNITED STATES PATENT OFFICE.

EUGENE A. FORD, OF UXBRIDGE, MASSACHUSETTS.

INTERNAL-COMBUSTION ENGINE.

1,165,086.     Specification of Letters Patent.     Patented Dec. 21, 1915.

Application filed January 13, 1911. Serial No. 602,418.

*To all whom it may concern:*

Be it known that I, EUGENE A. FORD, of Uxbridge, in the county of Worcester and State of Massachusetts, have invented certain new and useful Improvements in Internal-Combustion Engines, of which the following is a specification.

This invention relates to internal combustion motors, and has particular reference to that class of motors in which a volume of air in the combustion chamber is compressed to a degree sufficient to raise its temperature above the ignition point of the fuel, and in which the fuel is injected separately at a predetermined point in the cycle of operations and caused to burn by mingling with the highly heated air.

The objects of the invention are mainly, first, to provide means for thoroughly mixing and agitating the air and fuel during the combustion to cause rapid and complete combustion; second, to provide means by which fresh air is continually brought into contact with the inflowing fuel as long as the influx of fuel continues; third, to make provision for causing the combustion to take place in the central portion of the combustion chamber and particularly away from the walls of the chamber, thus protecting the walls by layers of air from the greatest heat of the flame, lessening the loss of heat by conduction through the walls, and preventing the deposit of tarry substances on the walls of the combustion chamber and the clogging of the piston packing; fourth, to provide a form of inlet valve in that type of the engine designed to use liquid fuel such that the liquid will enter the combustion chamber in the thinnest possible spray; fifth to arrange the inlet valve in such relation to a reservoir of fresh air in the combustion chamber that a current of pure air will be continuously supplied to the spray of fuel; sixth to provide a safety relief device in connection with the fuel inlet to prevent the production of excessive pressure in the combustion chamber; seventh, to provide a governing device in connection with a fuel injecting pump by which the quantities of fuel injected may be varied from nothing to the predetermined maximum to govern the speed of the engine without affecting the timing of the fuel ignition and thereby without wasting the fuel; eighth, to provide in a two-cycle engine means for more completely clearing the combustion chamber of burnt gases and cleaning and cooling the walls of the chamber during the period of exhaust.

In carrying out the foregoing objects in practical form, I have devised an engine of which the best and most effective type now known to me is illustrated in the accompanying drawings. This form of engine exemplifies one of the possible modes of accomplishing the various objects above set forth, and is hereinafter described in detail to illustrate my idea of means for accomplishing such objects. I do not consider, however, that the means exemplified herein are the only means possible of securing the results sought, and I do not therefore limit myself to such particular means, or to the particular embodiment of the invention illustrated and described.

In the drawings, Figure 1 represents in front elevation the engine above referred to. Fig. 2 represents a longitudinal section of the same. Fig. 3 represents a cross-section on line 3—3 of Fig. 2. Fig. 4 is a sectional elevation showing in detail the governing means for the fuel pump, the section being taken on line 4—4 of Fig. 1. Figs. 5 to 8 are diagrammatic views representing the phases of the stroke of the engine.

The same reference characters indicate the same parts in all the figures.

In the particular embodiment of the invention chosen for illustration I have shown the type operating on the two-stroke cycle, but in so far as concerns the first seven objects of the invention above-noted, it is not essential that the cycle should be of two strokes only, for the same principles are applicable to engines in which the cycle includes four strokes or more. Therefore, with the understanding that the principal part of the invention is not limited otherwise than to that type of engine in which the fuel is injected separately from the air, I will proceed to a detailed description of the particular form of engine illustrated.

1 represents the cylinder of the engine in which is contained a reciprocating piston 2 and the interior of which between its head 3 and the head of the piston forms a combustion chamber 4. As this particular type of engine operates on the two-stroke cycle, the cylinder is mechanically connected with a closed crank case 5. For a purpose which will later appear, that end of the cylinder next to the crank case, represented by 1ª, is of larger diameter than the combustion end of the cylinder and the end of the piston is enlarged at 2ª to have a close sliding fit in the enlarged cylinder portion. The crank case and enlarged cylinder end together form a receiving chamber 6 into which air is admitted from the atmosphere through ports 7. The latter constitute the only communication between the receiving chamber and atmosphere, the walls of the receiving chamber being otherwise airtight, and the ports are so located that they are uncovered when the piston is most remote from the shaft, or, in other words, is at the end of its compression stroke and ready to commence the working stroke. During the compression stroke a partial vacuum is produced in the admission chamber and when the ports 7 are uncovered the air rushes in until the pressures within and without the chamber are equal. In the wall of the cylinder is a passage 8 which leads from the crank case to ports 9 in the cylinder 1 which ports are covered and closed by the piston, except when the latter is near the outer end of its stroke. Nearly opposite to the ports 9 are exhaust ports 10 connecting with the exhaust 11. The exhaust ports are also covered by the piston except when near the crank end of its stroke, but are slightly nearer the head of the cylinder than the admission ports 9, and so are uncovered first. The uncovering of the ports 9 and 10 allows the burnt and exhausted gases to escape and fresh air to flow from the receiving chamber to the combustion chamber in the manner common to two-cycle engines. The piston head is provided with the usual baffle 12 to deflect the incoming fresh air toward the head end of the combustion chamber.

In the center of the cylinder head 3 is located the fuel inlet which is controlled by a valve 13. The fuel is forced past this valve, by means which will be shortly described, at the time of greatest compression, and immediately before the piston is ready to commence its working stroke. The combustion chamber is designed of such volume that the air is compressed to a degree at which the heat of compression is great enough to ignite the fuel. Thus when the fuel is forced past the inlet valve, it burns and produces further heat with development of greater pressure, without requiring any special ignition means. The air taken into the combustion chamber and compressed therein is free from admixture with fuel and the fuel is admitted only at the instant when it is desired that ignition take place.

In carrying out the first-named objects of the invention, I provide reservoir chambers in either the cylinder head or piston head or both, in which the air is packed during the compression stroke, such air being fresh and pure, and from which the fresh air issues as expansion takes place and mingles with the burning fuel and the fresh unignited fuel to supply oxygen thereto and agitate the same to obtain complete and rapid combustion. The reservoir in the head of the combustion chamber is contained between the wall 14 and the cylinder head, such wall being secured in any manner suitable for the purpose with the wall of the chamber. The only communication between this reservoir and the combustion chamber is through an opening 15 surrounding the fuel inlet. The reservoir is divided into smaller spaces by a partition 16 cut away or perforated at its periphery so as to establish communication between the subdivisions of the reservoir at the outer part of the reservoir only. Similarly a reservoir is provided in the head of the piston between the wall 17 secured to the piston and its end 18. A partition 19 is preferably provided between the walls 17 and 18, which partition is cut away or perforated to provide communicating spaces 20 at or near its periphery. The outlet from the piston reservoir is through one or more centrally located holes 21. It will be readily seen that when the piston makes its compression stroke the air is forced into the reservoir chambers and is contained therein at the same pressure as that in the combustion chamber itself.

The combustion of fuel admitted is first supported by the air in the chamber 4 alone, but as the combustion chamber enlarges with the movement of the piston, pure air is continuously supplied from the reservoir chambers, this supply producing in effect a constant feed of fresh air which is furnished as long as the fuel admission continues, and as expansion takes place. As the outlets 15 and 21 from the reservoir chambers are in line with each other, they cause the oppositely issuing streams of air to strike and to set up agitations which thoroughly mix the air and fuel during combustion and insure rapid and complete combustion. Moreover as these outlets and the fuel inlets are centrally located within the walls of the chamber, they cause the combustion to take place mainly in the central part of the chamber, so that the most concentrated heat is as far distant as possible from the chamber walls and the latter are somewhat protected by layers and cushions of cooler air and products of combustion. The effect of this is that less heat is absorbed by the walls of the chamber than if the protecting air layer were not present, and there is less loss of heat by radiation and conduction to the outer atmosphere. Further, the combustion is made complete in the center of the chamber and tarry, sooty deposits on the walls of the chamber are prevented. In addition, the partitions 16 and 19 insure the presence of layers or cushions of pure and relatively cool air next to the cylinder head and piston head respectively, and insure further that the hotter air in the outer compartments of the reservoir is expelled into the combustion chamber first before the air layers next to the cylinder and piston head pass out. Still another effect of these reservoir chambers is to cause a better clearing of the combustion chamber of the spent gases when the exhaust is opened, for at this period there is a sudden drop in pressure in the combustion chamber, whereupon the remainder of the air in the reservoir chambers rushes out and assists in clearing out the product of combustion.

The inlet valve 13 is so made as to inject the fuel in a fine spray. It is contained in a nipple 22 which passes through the cylinder head in the center thereof and has a flaring valve seat. The valve itself has a stem of considerable length which is fitted so accurately in the passage of the nipple that the valve when open makes an annular space of uniform width on all sides between itself and the seat. Longitudinal channels 23 in the valve stem conduct the fuel to a transverse encircling groove 24 which distributes it to all parts of the head. In being forced past the valve head the fuel is spread out in as fine a spray as is permitted by the nature of the fuel itself. The outlet of the valve nipple is central with the outlet 15 from the reservoir chamber of the cylinder head, and as a result the spray of fuel is directly met by the current of air flowing from the reservoir chamber. Thus every particle of the incoming fuel is met by fresh air and instant combustion results.

The fuel is admitted to the valve nipple under pressure from a pump and forces the valve open against the tension of a spring 25 and the pressure within the combustion chamber. The pump is positive in its action, and in order to avoid danger of excessively high pressures being obtained in the combustion chamber by continued influx of fuel after the pressure has reached the limit of safety, I provide a relief or safety device which allows the inlet valve to close when the pressure has reached as high a degree as is consistent with safety, and causes the remainder of the allotted charge to be supplied when the pressure has been diminished. This safety device consists of a chamber 26 communicating with the passage in the valve nipple and containing a plunger 27 which is packed if necessary to make a tight contact with the walls of the chamber, and is pressed upon by a spring 28. The spring 28 is of such strength that it prevents movement of the plunger until the pressure on the latter caused by the fuel is as great as that opposed by the gases in the combustion chamber to the opening of the valve 13 when the pressure in the combustion chamber has reached a predetermined point. For the purpose of illustration it may be assumed that the pressure within the combustion chamber is to be limited to 500 pounds per square inch. In this case the size of the clearance space in the combustion chamber will be so proportioned that the full compression stroke of the piston prior to the introduction of fuel will bring the pressure of the air to about 450 pounds. The spring 28 will then be designed to yield when the pressure on the plunger 27 is about 475 pounds per square inch. The temperature of air compressed adiabatically to 450 pounds, is about 956 degrees F. and therefore ample to ignite instantly any ordinary fuel. When fuel is admitted and burned, the pressure instantly rises, but when it has reached 475 pounds per square inch the safety plunger 27 yields and the valve 13 is closed, not to be reopened for admission of more fuel until the pressure in the combustion chamber has dropped to 475 pounds or under. Thus the safety device allows the fuel to be cut off when the pressure is up to or above the limit, and admits the fuel as long as any of the charge remains when the pressure is below the limit. I desire to note that the pressures named are chosen for illustration only and not for limitation.

A convenient form of pump with means for operating it is illustrated in Fig. 1. The pump consists of a chamber 31 in which is a plunger 32. A conduit 33 leads from the outlet of the pump to the valve chamber or nipple 22, while another pipe 34 conducts the liquid fuel from any supply or reservoir 35 to the inlet of the pump. Preferably the pump inlet is controlled by an inwardly opening valve 36 which is drawn toward its seat by a spring 37 and is held closed by the pressure of the liquid in the pump when the plunger is forcing the same into the engine cylinder.

The pump plunger is operated by the cam 37 on the engine shaft 38 and having a cam groove 39 in one face, which groove contains and acts upon a roll 40 carried by a lever 41 pivoted at 42 to a bracket 43 secured upon the engine base. The lever 41 actuates a second lever 44 which in turn is connected with the pump plunger by a link 45. The arrangement of the levers 41 and 44 and the connection between them is such as to afford means for varying the stroke of the pump. Accordingly these levers are so placed as to be approximately parallel, and are pivoted at respectively opposite ends, the pivot of one of the levers, as 41, being at its left-hand end, while the pivot 46 for the other lever is at the right-hand end of the latter. The connection between the two levers is made by a block 47 which slides longitudinally on the lever 41 and has a foot or key 48ª, shown in Fig. 4, which is contained in a guideway in the upper side of the lever.

A block 48 is pivoted upon the slide 47 and contained in a slot 49 in the lever 44. Conveniently the slide 47 is made of two plates which rest on lever 41 and embrace lever 44, carrying the block 48 between them. This construction, however, is not obligatory. A link 50 is connected to the slide and is adapted to be operated either by hand or by a governor to shift the slide along the levers. As will be readily seen, movement of the slide in either direction brings it farther from the fulcrum of one lever and nearer to that of the other, thereby lengthening the active arm of one lever and shortening that of the other. Thus when the slide is at the extreme right-hand end of its travel in the arrangement here shown, the maximum length of stroke is given to the pump plunger, while when it is at the extreme left-hand end of its travel, it is directly over the fulcrum point of lever 41 and the pump plunger is given no movement whatever. The maximum amount of fuel which can be burned effectively at any one stroke is determined in advance, and the pump proportioned accordingly to furnish this amount when operating at its fullest capacity. The arrangement described enables the quantity injected at each stroke to be diminished by infinitesimal amounts from this maximum to nothing. As the speed of the engine depends upon the amount of fuel burned, it will be readily seen that this mode of governing the amount of fuel affords a means for governing the speed of the engine with the utmost accuracy. Furthermore, this control does not affect the timing of the fuel admission, for the fuel admission is timed by the position of the cam and thus remains invariable, whatever may be the length of the plunger stroke. Accordingly the speed variation is accomplished without advancing or retarding the timing of the ignition with consequent waste of fuel.

The form of the cam surfaces which act on the roll 40 is shown by dotted lines in Fig. 1. The cam has a comparatively sudden rise at the point $a$, at which point the pump acts to force a charge into the valve chamber 22 and relief chamber 26, a dwell from $a$ to $b$, a gradual descent from $b$ to $c$, during which period the plunger is withdrawn to draw in a fresh charge from the tank, and a dwell from $c$ to $a$ when the pump is inoperative and the compression takes place. I have found that good results are obtained when the cam is so designed as to operate the pump for forcing in a charge of fuel during about 40 degrees of the cycle, and when the pumping stroke begins about 5 degrees before the dead center at the end of the compression stroke, and I have accordingly designed the cam here illustrated to secure these results. This particular design, however, may be varied without departing from the spirit of the invention.

The results obtained by the use of the reservoir chambers in the cylinder and piston heads is illustrated in the diagrammatic views, Figs. 5 to 8. Fig. 5 shows the engine at full compression with air for a new charge entering the crank case. Fig. 6 shows the engine at about the point in the cycle where the inflow of fuel ceases. The arrows in the combustion chamber indicate the manner in which the air issues from the reservoir or storage chambers and mingles with the fuel and flame. Fig. 7 illustrates the beginning of the exhaust showing how the air remaining in the storage chambers issues forth when the pressure drops, and aids in clearing out the spent gases. Fig. 8 shows the piston at the crank end of the stroke with the exhaust port and by-pass fully opened, illustrating the manner in which the fresh air flowing from the crank case finally forces out the remainder of the burnt gases and cleans and cools the walls of the combustion chamber.

There now remains to be described the purpose of the enlargement 1ª of the cylinder and 2ª of the piston. This is for the purpose of insuring a complete scavenging of the combustion chamber while the exhaust ports remain open. By virtue of the enlargement, a greater quantity of air is trapped in the crank case or receiving chamber than can be contained at the same pressure in the combustion chamber. In the present design the volume of the enlargement is about twice that of the combustion chamber, consequently twice as much air as is necessary to fill the combustion chamber at atmospheric pressure is drawn into the receiving chamber upon each stroke. Consequently, when the exhaust and by-pass are opened there is such an excess of air delivered from the crank case that some of the fresh air passes from the exhaust and in so doing effectively cleans out all of the products of combustion. When the exhaust is first opened the outflowing gases set up currents from all parts of the combustion chamber toward the exhaust ports, and the entering air accelerates these currents. The annular baffle at the head end of the piston deflects the incoming air so that it passes along the walls of the combustion chamber and toward the head end thereof before approaching the exhaust ports. It thus sweeps along the walls and through all parts of the combustion chamber, forcing the spent gases before it. The air first to enter comes in contact with the hot gases and is more or less heated by and mixed with them, but as the air first to enter is forced out of the exhaust by the excess following, that which is heated and mixed with the hot gases is expelled and the portion finally remaining is relatively cool and practically free from inert and exhausted gas. Ports 55 are provided in the end of the enlarged part of the cylinder to prevent the formation of a vacuum back of the piston enlargement before the same passes the ports 7 on its down stroke, and conversely to permit escape of the air entrapped after it passes the ports 7 on the up-stroke.

I claim,—

1. In an internal combustion engine compressing air to a temperature sufficient to ignite the fuel, an engine cylinder having a fuel inlet, a piston working in said cylinder having a circumferential recess opening into the combustion space of the cylinder for receiving a part of the air charge during compression and then delivering the same on the working stroke along the inner walls of the cylinder, and a storage space within the cylinder separated by a centrally perforated wall from the combustion space and adapted to receive air compressed in the cylinder and to deliver the same through said perforation into the central portion of the combustion chamber to mix with and ignite the fuel introduced on the working stroke of the piston.

2. In an internal combustion engine a combustion chamber, a piston moving therein adapted to compress air to a point at which its temperature is sufficiently high to ignite fuel, a fuel inlet for admitting finely divided fuel to the chamber while the pressure and temperature of the air therein are at the highest point, said inlet extending through the center of the end of the wall of the chamber, and a partition extending across the end wall of the chamber, within the chamber forming a storage space therein of equal width with the chamber, for storing a quantity of air at the high pressure and arranged to discharge such air in the center of the chamber adjacent to and surrounding the fuel inlet as the chamber enlarges, whereby to insure thorough combustion of the fuel and to confine the greatest intensity of the combustion to the center of the chamber.

3. An internal combustion motor comprising a cylinder inclosing a combustion chamber, a piston moving therein and forming one wall of such chamber, means for admitting fresh air to the chamber to be compressed by the piston to a degree of temperature sufficient to ignite fuel, means for independently admitting fuel to the chamber, and air storage spaces contained in the chamber and piston and having openings communicating with the interior of the chamber, into which air is forced by the compression, due to the movement of the piston and from which it issues from respectively opposite directions toward an intermediate point during the movement of the piston which enlarges the chamber, to support the combustion of fuel and confine the zone of greatest heat to the center of the chamber.

4. In an internal combustion motor having a combustion chamber provided with an end wall, means for admitting air to the chamber, a piston movable in such chamber toward and from said end wall and constructed and arranged to compress such air to the point at which its temperature is sufficient to ignite fuel, a fuel inlet, and a partition secured to the piston at a distance from the end thereof sufficient to form a storage space, and having a central opening, whereby to receive air under compression and to deliver such air during the working stroke of the piston.

5. In an internal combustion motor having a combustion chamber, a piston moving therein constructed and arranged to compress air to the point at which it generates heat sufficient to ignite fuel, a fuel inlet, a partition near the end wall of the chamber, forming an inclosed space surrounding said fuel inlet at the head end of the combustion chamber and having an outlet adjacent to the discharge point of the fuel inlet, and a partition in such space between the outlet and the head of the combustion chamber, whereby such head is protected by a layer of fresh air from the heat of combustion.

6. An internal combustion motor comprising a combustion chamber, having side and end walls, a piston forming one of said end walls movable toward and from the other end wall, a fuel inlet arranged to discharge into such combustion chamber centrally within the side walls, whereby the combustion is caused to take place at a point remote from the latter, means for admitting air to the combustion chamber, and means for protecting the end walls from the heat of combustion consisting of partitions mounted adjacent to said walls respectively, one of which is connected to the movable wall, providing spaces adjacent to such end walls, and partitions in such spaces separated from the end walls and having their only apertures near the side walls, whereby fresh air is forced into such spaces during the compression of air in the combustion chamber.

7. In an internal combustion motor in which air is compressed, means for admitting fuel under pressure to the space containing the compressed air, an inwardly opening check valve in such admission means, and a relief device for receiving the fuel and permitting such valve to close when excessive pressure occurs in the combustion space, said relief device being arranged to force the fuel into the combustion space automatically when the pressure therein diminishes.

8. In an internal combustion motor having a combustion chamber in which air is compressed, a fuel inlet opening into such chamber for admitting fuel, means for forcing fuel through such inlet with a positive pressure, an inwardly opening valve opening against spring pressure controlling such inlet and adapted to cut off fuel supply to the cylinder on occurrence of abnormal pressure in the combustion chamber, a relief device for receiving the fuel charge when such abnormal pressure closes the inlet valve, and means normally acting to expel the fuel from such relief device.

9. In an internal combustion motor having a combustion chamber in which air is compressed, a fuel inlet opening into such chamber for admitting fuel, means for forcing fuel through such inlet with a positive pressure, an inwardly opening valve covering such inlet and adapted to be closed by excessive pressure in the combustion chamber, a chamber in communication with such inlet, and a wall for such chamber normally actuated resiliently in a direction such as to reduce the effective volume of the chamber, and adapted to be displaced by the pressure of fuel when the inlet valve is closed to receive the unadmitted remainder of the fuel charge.

10. In an internal combustion motor having a combustion chamber in which air is compressed independently, a fuel inlet opening into such chamber for admitting fuel, means for forcing fuel through such inlet with a positive pressure, an inwardly opening valve covering such inlet and adapted to be closed by excessive pressure in the combustion chamber, a chamber in communication with the fuel inlet into which the unadmitted remainder of the fuel charge is enabled to flow when the inlet valve is thus closed, and means for ejecting the fuel from the chamber into the combustion chamber when the pressure in the latter diminishes sufficiently to enable the inlet valve to open.

11. An internal combustion motor in which air is separately compressed and fuel is separately admitted, a fuel inlet to such combustion chamber, a valve adapted to close such inlet when the pressure in the combustion chamber exceeds a predetermined point, means for forcing fuel through the inlet past such valve, and a yielding relief device adapted to yield under a pressure substantially equal to that closing the inlet valve, whereby to receive the unadmitted fuel and to force such fuel into the combustion chamber when the pressure in the latter diminishes.

12. In an internal combustion engine of the character described having walls inclosing a combustion chamber, a piston movably contained in said chamber and constituting one wall thereof, a fuel inlet having a flaring valve seat opening through one of such walls, a valve co-acting with said seat and having a flaring head to distribute the oil in a thin spray, in combination with a partition mounted adjacent to the wall through which the inlet enters, inclosing between itself and such wall an air storage space adjacent to the inlet and having an opening surrounding the discharge portion of the fuel inlet, whereby said space is adapted to receive air compressed in the combustion chamber and to discharge such air in intimate mingling with the finely divided fuel.

In testimony whereof I have affixed my signature, in presence of two witnesses.

EUGENE A. FORD.

Witnesses:
ARTHUR H. BROWN,
P. W. PEZZETTI.